Oct. 31, 1944.　　　E. P. DORMAN　　　2,361,824
GLASS WORKING MACHINE
Filed May 31, 1941　　　12 Sheets-Sheet 1

Oct. 31, 1944. E. P. DORMAN 2,361,824
GLASS WORKING MACHINE
Filed May 31, 1941 12 Sheets-Sheet 5

Fig. 3.

Inventor
Edgar Philip Dorman
by Young, Emery & Thompson
attys.

Oct. 31, 1944.  E. P. DORMAN  2,361,824
GLASS WORKING MACHINE
Filed May 31, 1941  12 Sheets-Sheet 8

Fig. 8.

Inventor
Edgar Philip Dorman
by Young, Emery & Thompson
Attys.

Oct. 31, 1944.  E. P. DORMAN  2,361,824
GLASS WORKING MACHINE
Filed May 31, 1941   12 Sheets—Sheet 9

Inventor
Edgar Philip Dorman
by
Young, Emery & Thompson
Attys.

Oct. 31, 1944.   E. P. DORMAN   2,361,824
GLASS WORKING MACHINE
Filed May 31, 1941   12 Sheets-Sheet 10

Patented Oct. 31, 1944

2,361,824

UNITED STATES PATENT OFFICE 2,361,824

GLASSWORKING MACHINE

Edgar Philip Dorman, London, England, assignor to The United Glass Bottle Manufacturers Limited, London, England, a British company Application May 31, 1941, Serial No. 396,208
In Great Britain May 6, 1940

9 Claims. (Cl. 49—50)

This invention relates to the production of thin hollow glass articles such as drinking glasses.

In the manufacture of thin hollow glass articles having one end closed and the other formed with a wide mouth, it is customary, where the ware is blown to shape in a mould, to form the article in the first place with an extension or moile shaped to facilitate the holding of the article whilst being blown and subsequently to sever or separate the extension or moile from the body of the article so as to give the ware its proper length and form of opening or mouth.

For separating the extension or moile from the article proper, a number of methods are known. Such methods may be divided into two groups, namely, those in which separation is effected before the article has completely cooled and those in which separation is effected after the article has been completely cooled.

A common disability attaches to most of the methods employed to separate the moile whilst the article is still hot, namely, that it is difficult to avoid the formation of a bead or thickened edge, the result of the necessary glazing operation following separation. Also, in instances in which the moiles are cracked-off or separated from the articles after they have been allowed to become cold, certain subsequent processes necessary for the production of a smoothly rounded edge or border, add considerably to the cost of manufacture.

It has been found, however, that the disability above referred to can be overcome by the adoption of a method in which the article whilst still hot is held stationary in relation to a ring of flames which is caused to revolve around it so that the flames play upon the line at which separation is to be effected. Also, when the glass has been sufficiently softened, the moile is gripped and the body of the article is pulled so as to stretch the reheated glass without, however, causing separation, and then, after momentary chilling, the flames are again allowed to play upon the stretched portion of the glass in order to complete separation by cracking the glass at the junction between the thinned portion and the relatively thicker part of the article.

The chief object of the present invention is to provide an improved form of apparatus or machine by which such a method may be carried into effect and important economies in manufacture effected.

The invention consists in a machine for separating or dividing hollow glass articles into two parts or from their moiles or extensions by reheating the article in a ring of flames and along the line at which separation is to be effected, stretching the reheated glass so as to thin it without causing complete separation, cooling or chilling the thinned wall of glass thus obtained and then reheating the thinned wall at the region of its junction with the normal thicker wall of the article so as to complete the separation characterised by the provision of a plurality of article separating units each arranged for movement in an endless circuit and each comprising in cooperative relationship an article holding device movable relatively to a rotary multiple jet reheating burner and an article gripping device, the arrangement being such that the units and their component devices are adapted to be operated in synchronised succession preferably from a common source of power.

The machine is preferably provided with a central stationary column and with a pair of vertically spaced frameworks or tables arranged for movement around the column and carrying respectively the plurality of article holding devices and the plurality of article re-heating means or multiple burners. Means is also preferably provided for raising and lowering the article holding devices relatively to the burners for the purpose of moving the articles into and out of the range of influence of the flame jets.

In order that the said invention may be clearly understood and readily carried into effect, the same will now be more fully described with reference to the accompanying drawings in which—

Figs. 2 and 3A are sectional plan views showing at different sectors sections at various levels of Figs. 1 and 1A;

The machine shown in the accompanying drawings comprises a base A which, in order to facilitate the displacement thereof, is carried upon wheels B. The said base supports a stationary column C around which revolve various elements of the machine. For instance, at or near the lower end of the column, there is rotatably mounted thereon a sleeve F which is supported by a thrust bearing E resting upon a collar or outwardly projecting part C1 of the column and to the lower portion of the sleeve F there is keyed a large spur gear G which is adapted to be rotated from a suitable source of power such as an electric motor G1. Immediately above the gear G there is rotatably mounted in position on the sleeve F, a sleeve H carrying two toothed sprockets J and K and above the sleeve H there is keyed to the sleeve F the hub of a circular table L which serves as a support for a series of rotatably mounted burner units which will be hereinafter described.

It will be seen that the sleeve F extends upwardly beyond the hub of the table L and that the exterior surface of the said upwardly extending portion is screw-threaded and carries an internally threaded member or nut M provided at the outer part of its upper face with gear teeth. Also, above the member M is arranged the hub N of a circular table O, said hub centreing itself around the sleeve F and, at its upper end, around the column C and being arranged with its lower end bearing against the inner part of the upper face of the member M. Secured to a convenient part of the hub N is a bracket P housing a radially disposed shaft Q carrying a pinion R which engages with the gear teeth formed upon the upper face of the member M.

Means are also provided for causing the table O to move in unison with the table L as the latter is rotated by the gear G and, for this purpose, the table L may be provided with a pair of upwardly extending cylindrical members S slidably mounted in suitable openings formed in two sleeve guide members T which are rigidly secured to and depend from the underside of the table O. It will be seen, therefore, that by rotating the shaft Q and the pinion R, the table O will be either raised or lowered relatively to the table L, the members S sliding within their guiding members T.

Bearing upon the upper end of the hub N of the table O is a thrust bearing N1 which supports the lower end of the hub V of a third circular table W which is mounted in position on the column C and is keyed to it so that it can slide axially upon column but is held against rotation relatively thereto. To the underside of the table W are secured cam track forming elements providing cam paths 1 and 2 by which the operation and movements of various elements of the machine are controlled and to which further reference will hereinafter be made.

As mentioned above, the table L serves as a support for a series of rotatably mounted burner units. For this purpose, a plurality of bracket members 7 are disposed at equal intervals around the outer margin of the table and are suitably secured to the underside thereof so that they project outwardly beyond the edge of the table and each such bracket serves to house bearings 8 for a hollow rotatably mounted and vertically disposed shaft 9. Adjacent the lower end of each shaft 9 there is keyed a toothed sprocket 10 and the portion of the shaft 9 below the toothed sprocket is embraced by a gland and stuffing box 9a formed in a downwardly projecting part 7b of the bracket 7. To the upper end of each shaft 9 is secured a member which is adapted to form the base of a circular range of burners and which is made up of an upper annular portion 11a connected by two hollow radially disposed and downwardly extending arms 11b with a hub portion 11c suitably connected with the shaft 9. Each range of burners consists of a series of inwardly directed radially disposed burner elements each made up of a jet 12, a tubular extension 13 carried upon a support 14 and a flexible pipe 15 connecting the extension with a chamber 10a formed in the aforesaid annular member 11a.

Figure 3:
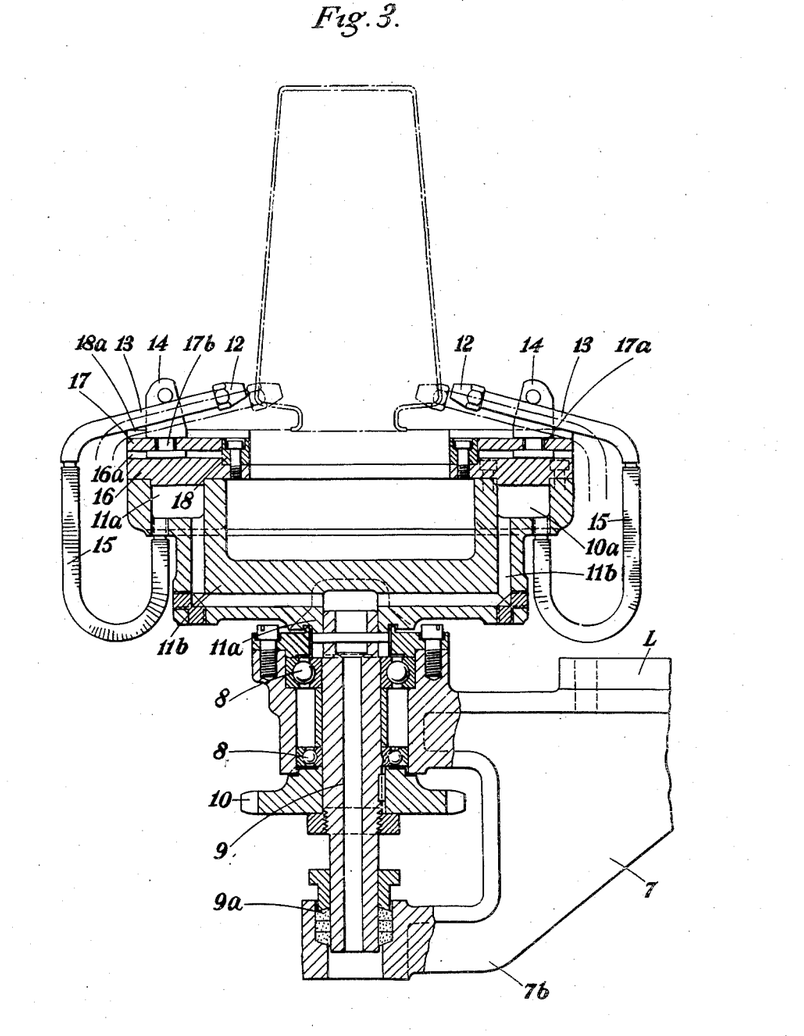
Fig. 3 is a vertical sectional detail view of one of the rotatably mounted burner units and the supporting means therefor.

In order that the burner elements or jets may be accommodated in positions in which they may most advantageously heat small or large articles respectively, each set of burners is arranged and mounted so that the burners shall be capable of being moved towards or away from the common centre around which they are disposed, that is to say, towards or away from the axis of rotation of the shaft 9. For this purpose, the annular member 11a is provided with a circular cover plate 16 in the upper surface of which a series of radial grooves 16a are formed and each of the aforesaid jet supports 14 is formed at its lower end with a rectangular extension accommodated in and adapted to be guided by one of the said grooves. Also, arranged in position on the plate 16 is another circular plate 17 capable of being displaced angularly thereon to a limited extent in either direction, the plate 17 being formed with a series of spirally disposed slots 17a through each of which extends a cylindrical portion 17b of one of the supports 14. The plate 17 is held in position by a circular cover plate 18 which is secured to the member 11a, and, through such cover plate, there is formed a plurality of radially disposed slots 18a through which the supports 14 extend. It will thus be seen that such support 14 is embraced both by one of the spirally inclined slots in the plate 17 and by one of the radially disposed slots in the plate 16. Consequently by an angular displacement of the plate 17 relatively to the plate 16, all of the supports 14 associated with one of the members 11a and the range of burners or jets 12 carried thereby can be caused to move simultaneously either towards or away from their common centre. For example, the jets may be adapted to be moved from the full line positions into the dotted line positions shown in Fig. 3 and vice versa.

Figure 2:
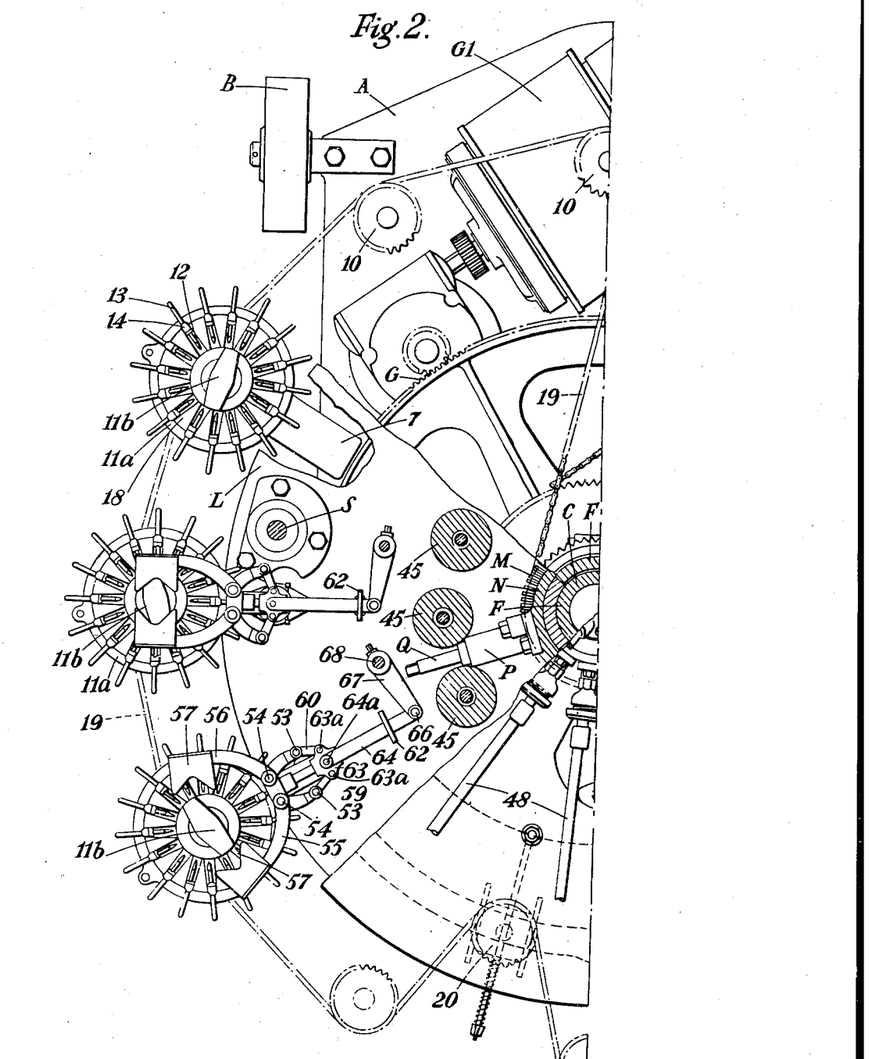
Figure 2A:
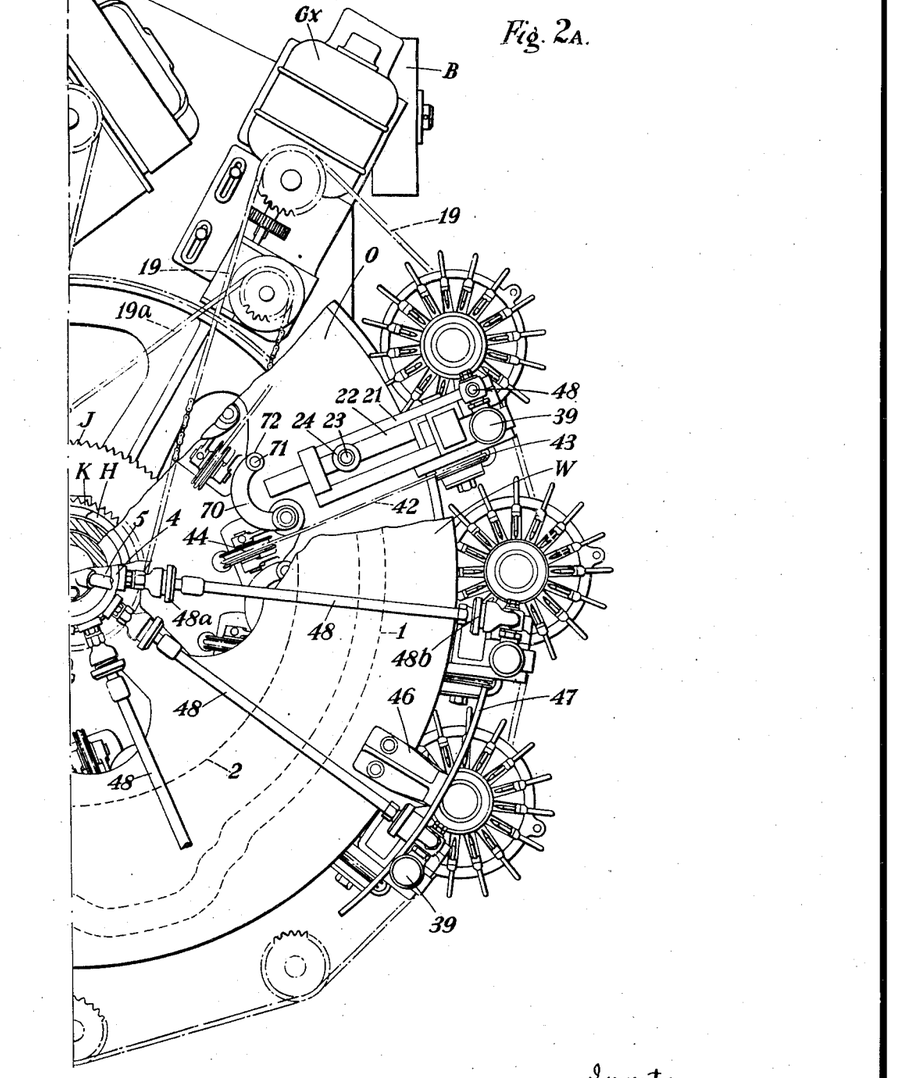

The means for rotating the circular ranges of burners about their own axes comprise an endless driving chain 19 which, as may be seen from Fig. 2, passes tangentially around the outside of one half of the total number of sprockets 10 so as to mesh with each, then passes inwardly and partially around the toothed sprocket K formed on the sleeve H, then outwardly and tangentially around the outside of the sprockets composing the other half of the total number of sprockets 10, then inwardly again, around a spring tensioning sprocket 20 and then outwardly to complete its endless circuit. The sleeve H is adapted to be rotated from a suitable source of power and, for this purpose, the sprocket J may be connected by an endless chain 19a with a sprocket connected through suitable reducing mechanism with the electric motor GX.

The heads or devices for holding or supporting the glassware are carried by the table O and are spaced equally around the outer margin of the table so that there is one head for each circular range of burners. As will be seen, in the form of the invention illustrated, each head is adapted to receive the article to be treated, in an upright position, to grip it thus, then to invert it and then to impart to it certain axial movements at the conclusion of which the head is reverted to bring the treated article into an upright position and the means for gripping the article is then released so that the article may be removed from the machine. The heads are so disposed around the table O that the article held in each is maintained in accurate axial alignment with the respective ring of burners with which it co-operates. All such heads are identical and consequently it is only necessary to describe their construction by reference to one of them. In this connection, reference is directed to Figs. 4 and 5, from which it will be seen that a bracket 21 is bolted to the upper face of the table O and is formed with a rectangular horizontal channel forming a guide for radially slidable member 22, from the upper side of which there projects a pin 23 carrying a roll 24, which engages the cam track I formed upon the underside of the table W, and upon the underside of the member 22 rack teeth are cut for a part of its length. Engaging with the rack teeth is a pinion 25 which is secured to or is integral with a larger gear 26 so that both are free to revolve together upon a stationary pin 27 carried by the bracket 21. Also, in an upwardly extending portion of the bracket 21 there is provided a vertical rectangular channel forming a guide for a vertically slidable member 28 having rack teeth cut in one side thereof for a part of its length, which teeth engage with the gear 26. The vertically slidable member 28 is bored axially for its entire length and at its lower end it has a laterally projecting extension 29 which is bored horizontally so that the horizontal bore intersects the axial or vertical bore. Mounted in the said horizontal bore so as to be free to be displaced angularly to a limited extent within the horizontal bore is a shaft-like member 30, which terminates at one end in a flange 30a, and at its opposite end has a toothed pinion 33 keyed upon it. Over a part of its length, the member 30 is hollow, there being a bore 30b extending axially from the flanged end for a certain distance therethrough so that at its inner end the bore 30b meets or merges into an opening or port 30c cut radially in the member 30 so as to connect the bore 30b with the vertical axial bore in the part 28.

Attached to the flanged end of the member 30 is a bracket member 31 formed with a suitable vertically disposed flange for attachment to the member 30 and with a horizontally disposed flange to which is secured a cup 32. The bracket member 31 is provided with a passage which extends from its horizontal face through to its vertical face where it communicates with the axial bore 30b in the shaft 30. Said bracket member is provided also with an abutment 31a which is adapted to engage a similar abutment 29a formed upon the extension 29 of the member 28 when the shaft 30 is moved anticlockwise about its axis to a certain position. The interior of the cup 32 is formed so as to fit approximately to the shape of the bottom of the article to be treated, and small holes 32a are provided so that they extend from the bottom of the inside of the cup and communicate with the passage formed in the part 31. Also, the lower end of the axial bore in the member 28 is closed, below the region of the shaft 30, by a tightly fitting plug 28a, and above the region of shaft 30 the bore is provided with an axially displaceable piston valve 34 (see Figs. 4, 5, 6 and 7) mounted in position on the lower end of a rod 35 which extends upwardly through the member 28 to beyond the upper end of the latter and terminates in a tappet 39. The piston valve is hollow from its lower end upwardly to a point about midway of its length where the hollow interior communicates with a crosshole 34a leading to its circumferential surface.

Figures 4, 6:
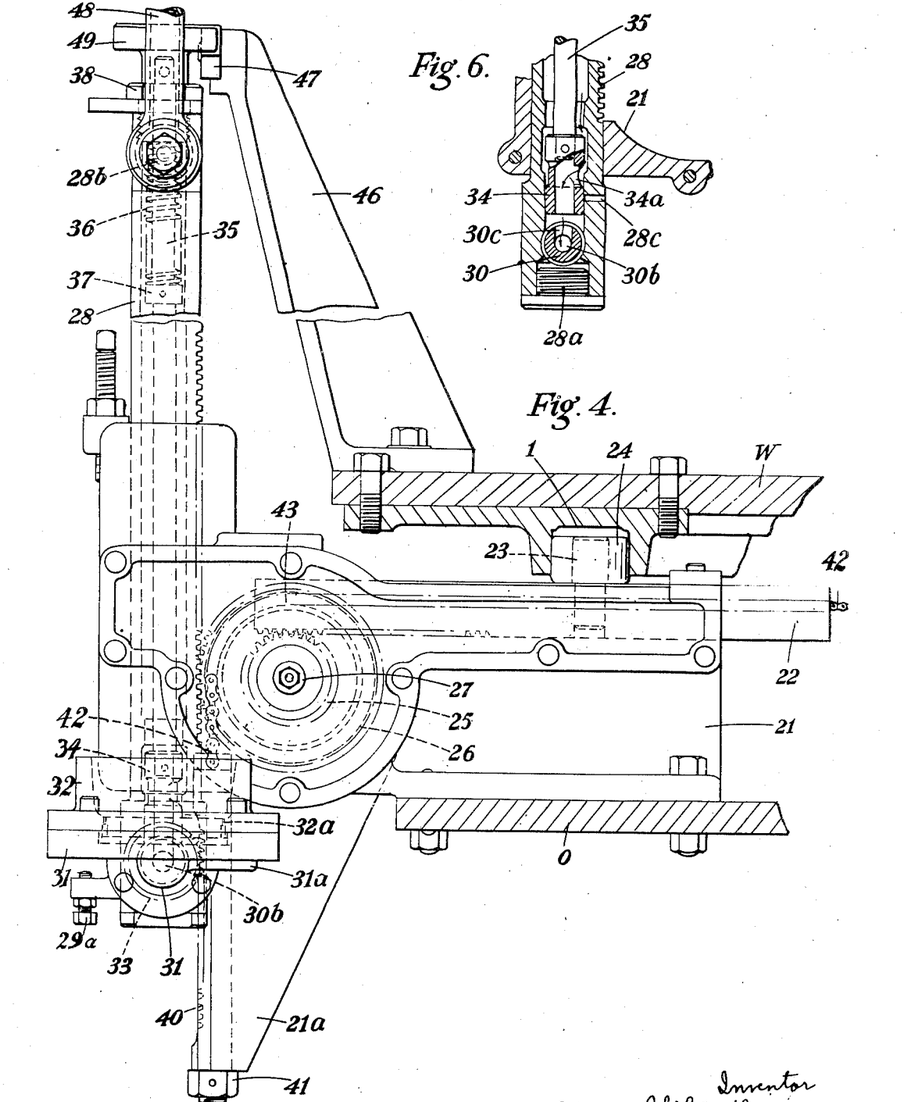
Figs. 4 and 5 are detail views of the devices or heads for holding or supporting the articles being treated.
Figs. 6 and 7 are detail views showing different positions of a valve member which is associated with the devices or heads for holding or supporting the articles for the purpose of controlling the application of a suction effect thereto.
Figures 5, 7:
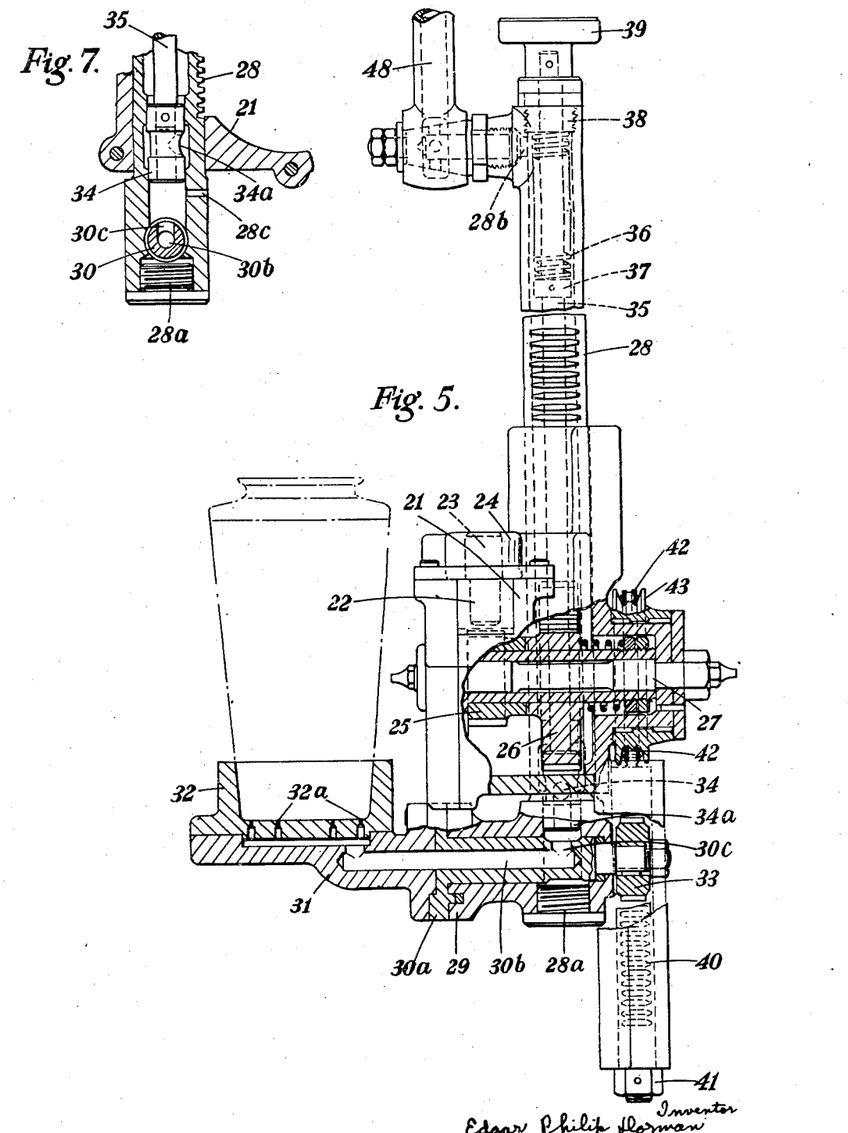
Figure 8:
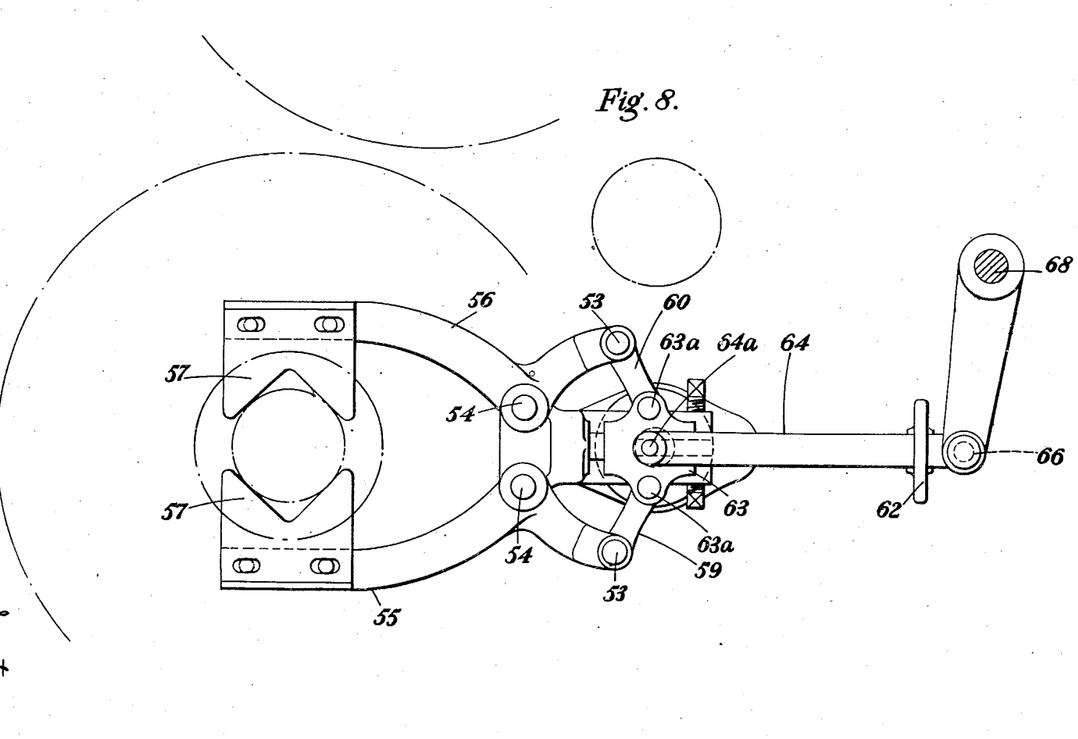
Figs. 8 and 9 are detail views of the article gripping means.
Figure 9:
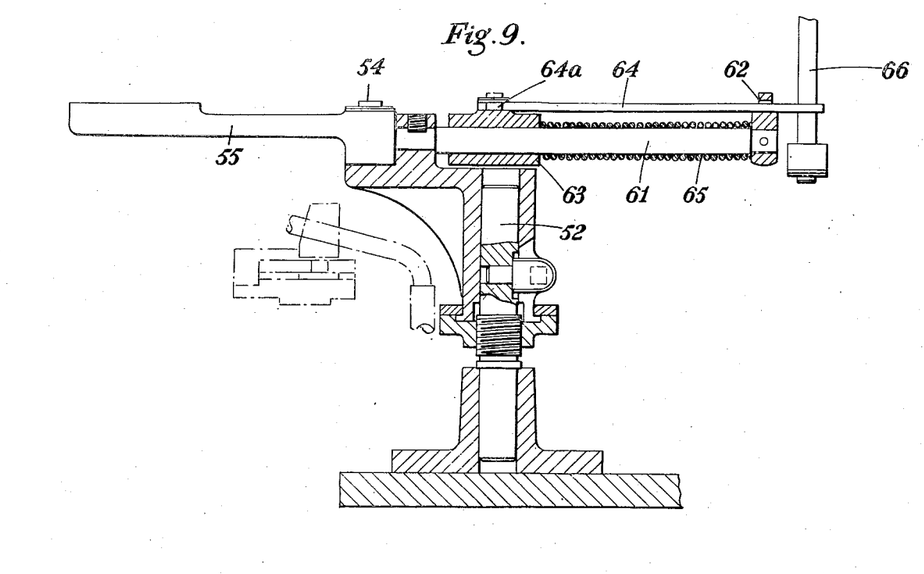
Figure 10:
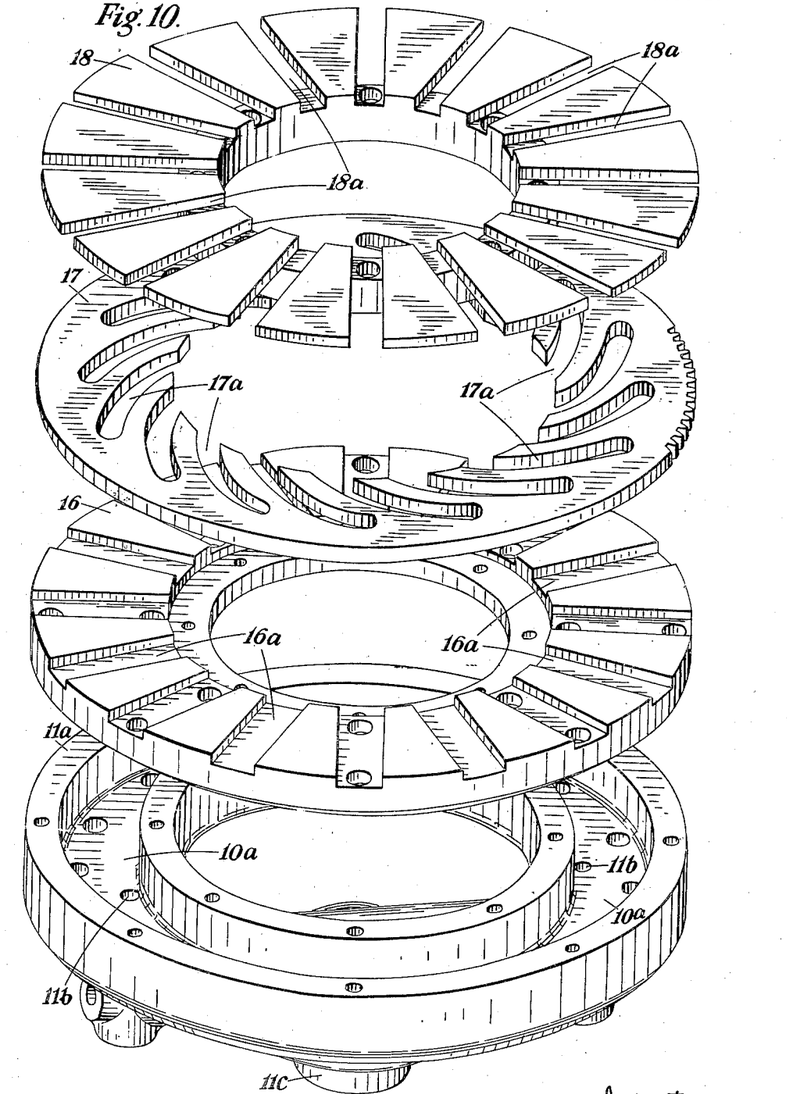
Fig. 10 is a detail view illustrating the component parts of a means which is provided for enabling the burners to be adjusted for operation on small or large articles.

A closely fitting bush 38 serves as a guide for the upper portion of the rod 35, and immediately beneath and abutting the bush 38, a coil compression spring 36, surrounds the rod 35 and acts on a collar 37 attached to the rod 35 in order normally to hold the valve 34 in its lowered position, see Figs. 4, 5, and 6 in which the tappet 39 rests upon the bush 38 and in which the valve 34 establishes, by way of its central bore and its crosshole 34a communication between the space within the member 28 below the valve 34 and the space within the member 28 above the valve 34. Near the upper end of the member 28, the space above the valve is in communication with a side opening 28b to which further reference will be made hereinafter, and near the lower end of the member 28, its axial bore is connected to the outside air by a small opening 28c.

In the normal condition described above, in which the valve 34 is in its lowered position, the valve covers and closes the opening 28c (as shown in Fig. 6). When however, the tappet 39 is raised so as to move the valve 34 to the position shown in Fig. 7, the upper end of the valve by virtue of its fit in that part of the axial bore in the member 28 completely obstructs communication between the spaces within the member 28 below and above the valve and, at the same time, the lower end of the valve uncovers the inner end of the opening 28c, so as to provide passage thence for air to pass from the outside to that region of the axial bore in the member 28 below the valve 34.

As may be seen from Fig. 4, a downwardly projecting part 21a of the bracket 21 forms a guide within which a short rack 40 is mounted so as to be slideable vertically. The rack 40 engages the pinion 33 and is normally held in a raised position in which its stop collar 41 bears against the lower end of the guide 21a, by a chain or other flexible member 42 attached to the upper end of the rack and passing up and over a pulley 43 mounted upon bracket 21, then horizontally toward the centre of the machine, then over a pulley 44 (see Fig. 1) supported upon the table O, and then downwardly where it is attached to and supports a counterweight 45.

At the outer margin of the stationary cam table W, there is secured a bracket or brackets 46 serving to support a fixed cam member 47 which is adapted at a certain phase in the movement of the rotary elements of the machine, to engage the tappet 39 and to raise the same from the position in which it is shown in Figs. 4, 5 and 6 in which the valve 34 is in its lowered, or open, condition, to the position shown in Fig. 7 in which the valve 34 is raised to its upper or closed position.

From the foregoing, it will be seen that, with the cam roll 24 and the rack member 22 drawn fully to the right, as shown in Fig. 4, by the action of the cam path 1, the vertically movable member 28 is fully raised through the inter-engagement of gears 25 and 26 with racks 22 and 28 respectively. Also, due to the pull on the chain 42 produced by the counterweight 45, the collar 41 on the rack 40 is bearing against the lower end of the guide 21a, and, as a consequence of the engagement between the teeth of this rack with the pinion 33, the later is being held in a position in which the work holding cup 32 is facing upwards. When now in the course of revolution of the machine, the roll 24 meets an outwardly inclined portion of the cam track 1, the slide 22 will be moved to the left and, in turn, will rotate the pinions 25 and 26 and thereby draw the slide 28 downwardly. As the pinion 33 is in mesh with the rack 40 which is held stationary by the pull of counterweight 45, the downward movement of the pinion 33 will cause the pinion to revolve anticlockwise until it has moved through 180°, whereupon the cup 32 will be inverted. At this stage, the abutment 31a will engage the abutment 29a formed on the extension of the member 28, when no further revolution of pinion 33 will take place. As a result, the further downward travel of the member 28 will cause the locked pinion to draw the rack 40 downwardly with it against the pull of the counterweight, no further relative movement occurring as between the rack 40, the pinion 33 and slide 28.

Upon the member 28 being again raised, the operations are reversed, i. e., the upward pull upon the rack 40 of the counterweight 45 acting upon the pinion 33 continues to keep the abutment 31a pressed against the abutment 29a, until, in due course, the stop collar 41 again meets the lower end of the rack guide 21a. The rack 40, being now prevented from further movement and the pinion 33 continuing to be raised by the part 28, the pinion 33 is forced to revolve clockwise until the part 28 comes to rest at the top of its travel when the cup 32 will have returned to its upright position.

Figure 1:
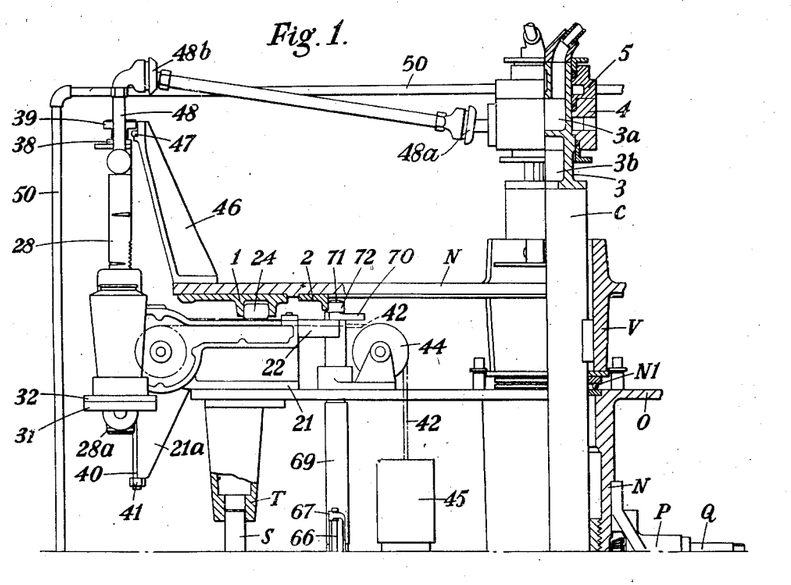
Figs. 1 and 1A each show a vertical sectional view of one-half of a machine embodying the invention.
Figure 1A:
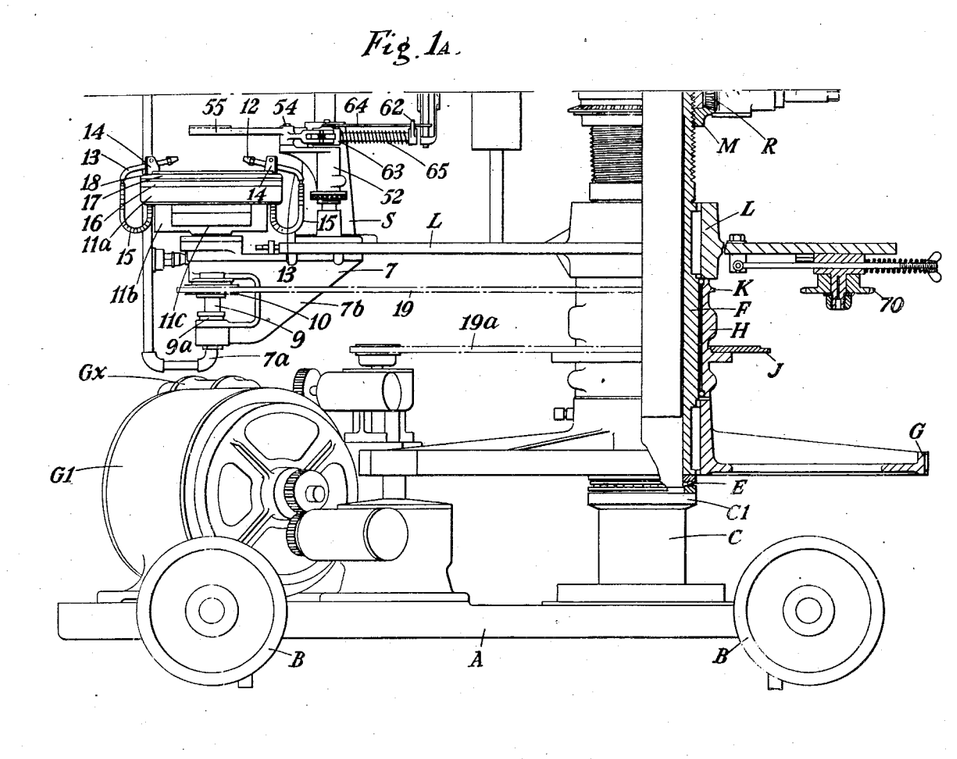

As may be seen from Fig. 1, there is mounted in position on the upper end of the column C, a distributing device made up of a central stationary element 3 having rotatably mounted thereon a rotary element comprising two superposed annular member 4 and 5. The stationary element consists of a hollow vertically disposed cylindrical member divided as regards its height into two separate chambers 3a and 3b.

To each chamber a separate supply pipe is connected, viz., to the lower chamber 3b there is a connection with a source of vacuum and to the upper chamber there is connected a source providing a mixture of coal gas or its equivalent, and oxygen or compressed air. Suitable openings are formed in the walls of each of the chambers in the part 3 to give access to the flow of gas or air respectively to or from the part 3 and the parts 4 and 5. Also, suitable pipes lead from the outer surfaces of each of the rotary members 4 and 5 to the necessary points in the machine. For example, to each work-holding head or device there is a radially disposed pipe line 48 connecting the outlet opening 28b formed in the upper part of the member 28 to part 4 for vacuum, this pipe line being suitably articulated at 48a and 48b to accommodate vertical displacements due to the movements of the member 28 and to the height adjustment provided for the table O. Also, to each ring of burners there is a pipe connection 50 carrying a mixture of gas, and oxygen or air, under pressure from a chamber in the member 5.

For co-operating with the work supporting heads or devices, for the purpose of effecting a certain stretching of the glass after the articles have been locally reheated in the rings of burners, a series of gripper mechanisms are also preferably provided, there being one such gripper mechanism corresponding to each work supporting head and its co-operating ring of burners. For this purpose, a series of pedestals 52 may be mounted in position on the upper surface of the table L so that they are spaced equally therearound, said pedestals having secured to their upper ends brackets which project upwardly and outwardly therefrom and support two upwardly extending journals or pivot pins 54 which serve to fulcrum respectively two arms 55 and 56, each terminating at one end in a claw like member 57 adapted together to grip the moile of the article to be dealt with. The other end of each arm respectively is connected by a pin 58 to one of two links 59 and 60. Also, projecting horizontally from the pedetsal is a cylindrical guide 61, which terminates in a plate 62 and upon which there is adapted to slide a member 63 formed with 3 upstanding pins, 63a, 64a, and 65a. One end of each of the links 59 and 60 is pivotally mounted on the pins 65a and 63a respectively and pivotally mounted on the pin 64a one end of a link 64, the remote end of which passes freely through an opening formed in the plate 62.

Surrounding the guide 61 there is arranged a coil spring 65 in compression so that it bears at one end against the slidable member 63 and, at the other end, against the plate 62. Thus, it will be seen that the pressure of the spring 65 upon the member 63, through the medium of links 59 and 60 upon the arms 55 and 56, will tend to press the claws 57 toward ane another. The end of link 64 which is remote from part 63 engages freely with a pin 66 supported vertically by one end of an arm 67 whose other end is keyed to a vertical shaft 68 and the latter extends upwardly and is supported in a bearing member 69 which depends from the table O. The shaft 68 extends above the bearing 69 and to the extension there is keyed the hub of an arm 70 provided at its end with a pin 71 which carries a roller 72 engaging the cam path 2 on the underside of the table W.

The movement of the rotary elements of the machine around the central column C is preferably continuous but, if desired provision may be made for intermittent or step-by-step rotation or for operation under conditions in which periods of rotation alternate with periods of rest.

The operation of certain elements or parts of the machine has already been described in some detail but in order to make clear the operation of the machine as a whole the manner in which it carries out the various steps of effecting the separation of the moile from the article proper will now be described as applied to a machine in which the various work-holding units and burner ranges rotate continuously around the central column. It will be understood that, in such a machine, each ring of burners will rotate continuously about its own axis in addition to moving around the column. Also, that a source providing a mixture of oxygen or air and coal gas or its equivalent is connected with the chamber formed in the rotary member 5 of the distributing device provided at the upper end of the column and that such gas mixture can pass continuously to all of the gas burners by pipe lines 50 which extend outwardly and downwardly from the rotary member 5 and are connected at their lower ends by bends 7a with openings formed in the lower ends of the downwardly projecting parts 7b of the brackets 7 in order that the gas mixture can pass upwardly through the hollow shafts 9 into the passages formed in the base portions 11a of the circular ranges of burners. Further, that the chamber formed within the rotary element 4 of the distributing device is connected with a source of vacuum and is in communication with the axial bores of the members 28 associated with the various work supporting heads or devices.

Figure 11:
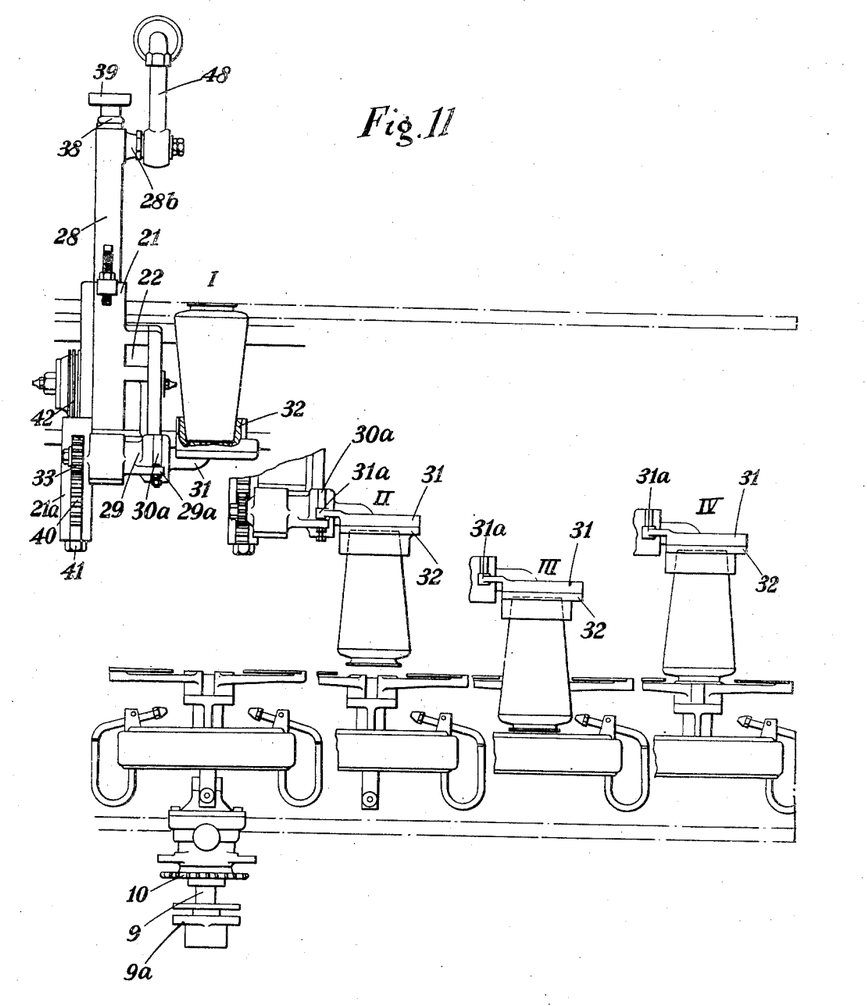
Figs. 11 and 11A are halves of a diagrammatic illustration of the sequence of steps or movements through which the articles pass during their movements relatively to the burners.

During each revolution of the machine, each work-supporting head or device is caused to move relatively to the circular range of burners with which it is associated so as to carry the article being operated upon through the various process phases or positions which are depicted diagrammatically in Fig. 11. In position I, or at the point in the movement of the rotary elements of the machine at which the articles to be treated are introduced, the work-supporting head or device will have been fully raised by the action of the members influenced by the cam path 1, the cup 32 carried by such work-supporting head will be upright as shown and the valve 34 associated with that work-supporting head will have been closed by the action of the cam 47 on the tappet 39. Under these conditions, an article and moile to be treated or operated upon is placed in an upright position in the cup and, as the head moves away from this position, the tappet 39 passes beyond the control of the cam 47 and the spring 36 immediately acts to lower and open the valve 34. The base of the article resting over the small holes 32a in the base of the cup 32 tends to seal the latter and, under the urge of vacuum, any residual air between the article and the cup now passes down through these small holes through the part 31, thence through the axial bore 30b, and ports 30c, and so past the open valve 34 to the upper end of the axial bore in the member 28, and away via pipes 48 to the source of negative pressure or vacuum. The article is now firmly held in the cup 32 by atmospheric pressure and, by the continued movement of the head, the roller 24 on the slide 22 is brought into engagement with an outwardly inclined part of the cam track 1 with the result that, by the action of the gearing in the work supporting head, the slide 28 commences to descend and the cup 32, at the same time, commences to move outwardly and downwardly until it is completely inverted with the article occupying the position II shown in Fig. 11.

The now inverted article, held in the cup 32, then continues to move downwardly until it assumes the position III shown in Fig. 11 in which its lower end is disposed within the revolving ring of flames from the multiple jets 12 with the flames impinging upon the wall of the article at the level at which separation is to be effected.

At this point in the movement of the head, the cam roll 24 reaches a part of the cam track 1, which is circular, and as a result, no further movement is imparted to the slide 28.

The article continues thus to be reheated in the burner for a predetermined period, at the conclusion of which the roll 24 meets an inwardly inclined part of the cam track 1, the effect of which is that by the raising of the slide 28, the article is lifted above the ring of flames until it assumes the position IV shown in Fig. 11. At this position, the cooperating cam track 1 is for a short distance circular in form so that the slide 28 is caused momentarily to dwell in its upward travel.

Figure 11A:
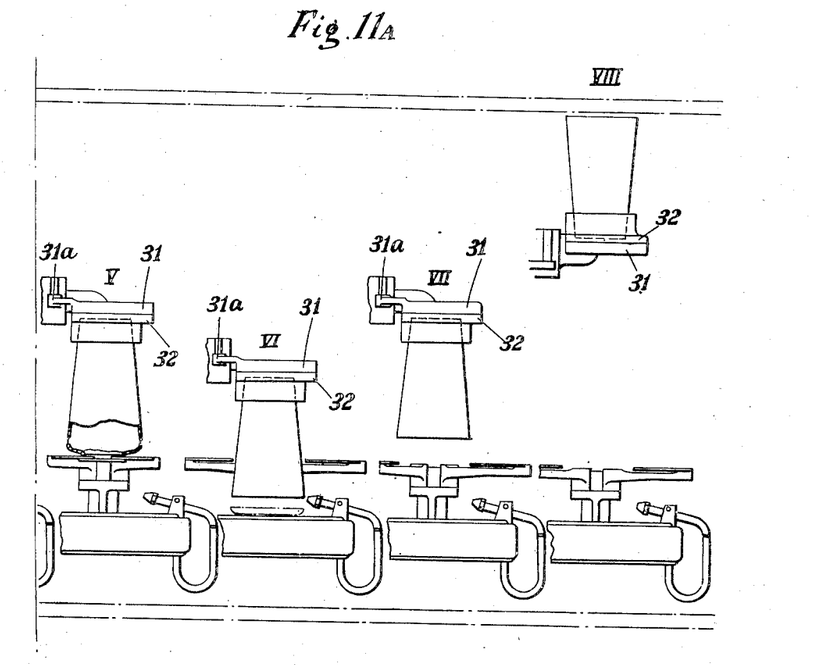

Turning now to the gripper unit which is arranged to cooperate with the work holding head above described, it will be seen that during the foregoing sequence of events, the cam track 2 has retained the roll 72, the pin 71 and the lever 70 drawn to the right, as viewed in Fig. 1, and, through the agency of the shaft 68 and the lever 67, the pin 66, by its engagement with the link 64, has kept the part 63 drawn to the right against the pressure of the spring 65, and, through the agency of links 59 and 60, acting on the arms 55 and 56, the claw members 57—57 are held widely separated. Just prior to the slide 28 having momentarily paused in its upward travel as described above, the roll 72 has met a part of the cam track 2 that has an outward inclination permitting the spring 65 to act to close the claws 57—57 and, at the moment at which the slide 28 comes to rest, the claws 57—57 close on the moile, gripping it under the pressure of the spring 65 acting through the intervening linkage. As soon as the claws have closed, the roll 24 meets a further short inwardly inclined part of the cam track 1, followed by a further circular part of this track. As a result, the slide 28 is again raised a short distance and again comes to rest, and, since the article is at this stage held both in cup 32, that has been raised, and by the claws, that have remained stationary, the softened glass in the reheated zone yields and is stretched and so thinned until the article occupies the position indicated at V in Fig. 11A. During the subsequent dwell portion of the cam track 1 chilling of the thus thinned zone on the article occurs and the roll 72 meets an outwardly inclined part of the cam track 2 with the result that the arms 55 and 56 operate to open the claws 57—57 and to hold them apart for for the remainder of the cycle of operations.

At the conclusion of the above mentioned dwell period, the roll 24 meets an outwardly inclined part of the cam track 1, and the slide 28 again moves downwardly to return the article to the same position (see position VI shown in Fig. 11A) in the ring of flames that it previously occupied. The roller 24 then meets a circular part of the cam track 1 which maintains the slide 28 stationary for a short period and during this time, the flames play on the junction of the normal thickness of the wall of the article, with the thinned stretched part, and as soon as this occurs, the moile is instantly cracked off cleanly around its entire circumference, due to internal stresses within the thinned part of the glass. Also, the flames play upon the border of the wall of the article so as to glaze it, at the conclusion of which the roll 24 meets an inwardly inclined part of the cam track 1, followed by a circular part. The slide 28 is thereby first raised a certain distance with cup 32 inverted so that the article is moved into the position VII shown in Fig. 11 after which a further rise of the slide causes the cup 32 to be reverted to an upright position and to be held in this upright fully raised position with the article upright as shown in position VIII of Fig. 11. Shortly thereafter, the tappet 39 meets and engages the cam 47, and is raised by it with the result that the valve 34 is raised so as to cut off communication between the source of vacuum and the cup 32, and, at the same time, to recover the hole 28c in order to permit air to enter below valve 34 to neutralize the state of vacuum then existant.

The article now completely treated is then removed from the machine and the above sequence of steps is repeated on the next article placed in position in the article holding device. The said sequence of steps is also repeated in turn by each unit of the machine.

I claim:

1. A machine as claimed in claim 7 provided with a central stationary column and with a pair of vertically spaced tables, movable around said column and carrying respectively the plurality of article supporting heads and the plurality of burners.

2. A machine as claimed in claim 7 provided with means operative during the synchronised movements of the article supporting heads and burners to displace said heads vertically relatively to the burners to move the articles into and out of the range of the burners and to stretch the glass.

3. A machine as claimed in claim 9 provided with means operative during the synchronised movements of the article supporting heads and burners to displace said heads vertically relatively to the burners to move the articles into and out of the range of the burners and to stretch the glass, and in which the means for displacing said heads vertically are adapted to lower the article relatively to the cooperating multiple jet burner for reheating purposes, then to raise the article in order to remove the same from the reheating influence of the burner and to stretch the re-heated glass, and subsequently again to lower the article into its former position to effect the separation of the moile.

4. A machine as claimed in claim 9 in which the article supporting heads are adapted to receive the articles in an upright position and then to invert the same to subject them to the action of the burners.

5. A machine as claimed in claim 9 in which the article supporting heads are adapted to receive the articles in an upright position and then to invert the same to subject them to the action of the burners, and including means brought into operation by and during the movements of the heads for inverting the latter and restoring them to their former positions at the completion of each cycle of operations.

6. A machine as claimed in claim 7 including suction means for holding the articles in position in the supporting heads and means for releasing the suction at the completion of the cycle of operations.

7. In a glass working machine for severing a moile from an article of glassware, a plurality of articles supporting heads arranged for movement in an endless circuit, a plurality of rotary multiple jet burners arranged for movement in an endless circuit co-axial with and spaced axially from said first mentioned circuit, means operated from a common source of power for synchronously moving the supporting heads and burners in said circuits, means for rotating the burners about their own axes while moving synchronously with the supporting heads, means for displacing the supporting heads and articles axially relatively to the rotating burners to position the articles to be reheated thereby along the lines at which separation of the moiles is to be effected and to subsequently withdraw said articles from the burners, moile grippers located on the same side of the burners as the supporting heads, means brought into operation after said withdrawal of the articles to cause the grippers to seize the moiles of the reheated articles, means for effecting a further slight withdrawal of said heads while the moiles are thus seized thereby effecting a stretching and thinning of the reheated glass, means for releasing the moiles from said grippers, and means for displacing said heads towards said burners after said thinning to bring the articles again under the reheating influence of the burners in order to reheat the thinned wall at the region of its junction with the normal thicker wall of the article thereby completing the separation.

8. In a glass working machine for severing a moile from an article of glassware, a plurality of article supporting heads arranged for movement in an endless circuit, a plurality of rotary multiple jet burners arranged for movement in an endless circuit co-axial with and spaced axially from said first mentioned circuit, means operated from a common source of power for synchronously moving the supporting heads and burners in said circuits, means for rotating the burners about their own axes while moving synchronously with the supporting heads, means for displacing the supporting heads and articles axially relatively to the rotating burners to position the articles to be reheated thereby along the lines at which separation of the moiles is to be effected and subsequently to withdraw said articles from the burners, moile grippers brought into operation after said withdrawal of the articles to cause the grippers to seize the moiles of the articles, means to effect a further slight withdrawal of the articles while the moiles are thus seized thereby effecting stretching and thinning of the reheated glass, said moile grippers and said article supporting heads being operable on the article on the same side of the burners, means for releasing the moiles from said grippers, and means for displacing said heads towards said burners after said thinning to bring the articles again under the reheating influence of the burners in order to reheat the thinned wall at the region of its junction with the normal thicker wall of the article thereby completing the separation.

9. In a glass working machine for severing a moile from an article of glassware, a plurality of article supporting heads arranged for movement in an endless circuit, a plurality of rotary multiple jet burners arranged for movement in an endless circuit co-axial with and spaced axially from said first mentioned circuit, means operated from a common source of power for synchronously moving the supporting heads and burners in said circuits, means for rotating the burners about their own axes while moving synchronously with the supporting heads, means for displacing the supporting heads and articles axially relatively to the rotating burners to position the articles to be reheated thereby along the lines at which separation of the moiles is to be effected and subsequently to withdraw said articles from the burners, moile grippers brought into operation after said withdrawal of the articles to cause the grippers to seize the moiles of the articles, means to effect a further slight withdrawal of the articles while the moiles are thus seized thereby effecting stretching and thinning of the reheated glass, said moile grippers and said article supporting heads being operable on the article above the burners, means for releasing the moiles from said grippers, and means for displacing said heads towards said burners after said thinning to bring the articles again under the reheating influence of the burners in order to reheat the thinned wall at the region of its junction with the normal thicker wall of the article thereby completing the separation.

EDGAR PHILIP DORMAN.